June 21, 1960 R. L. ANNIS 2,941,860
METHOD OF PRODUCING FINELY DIVIDED Ca CO₃
Filed July 10, 1956
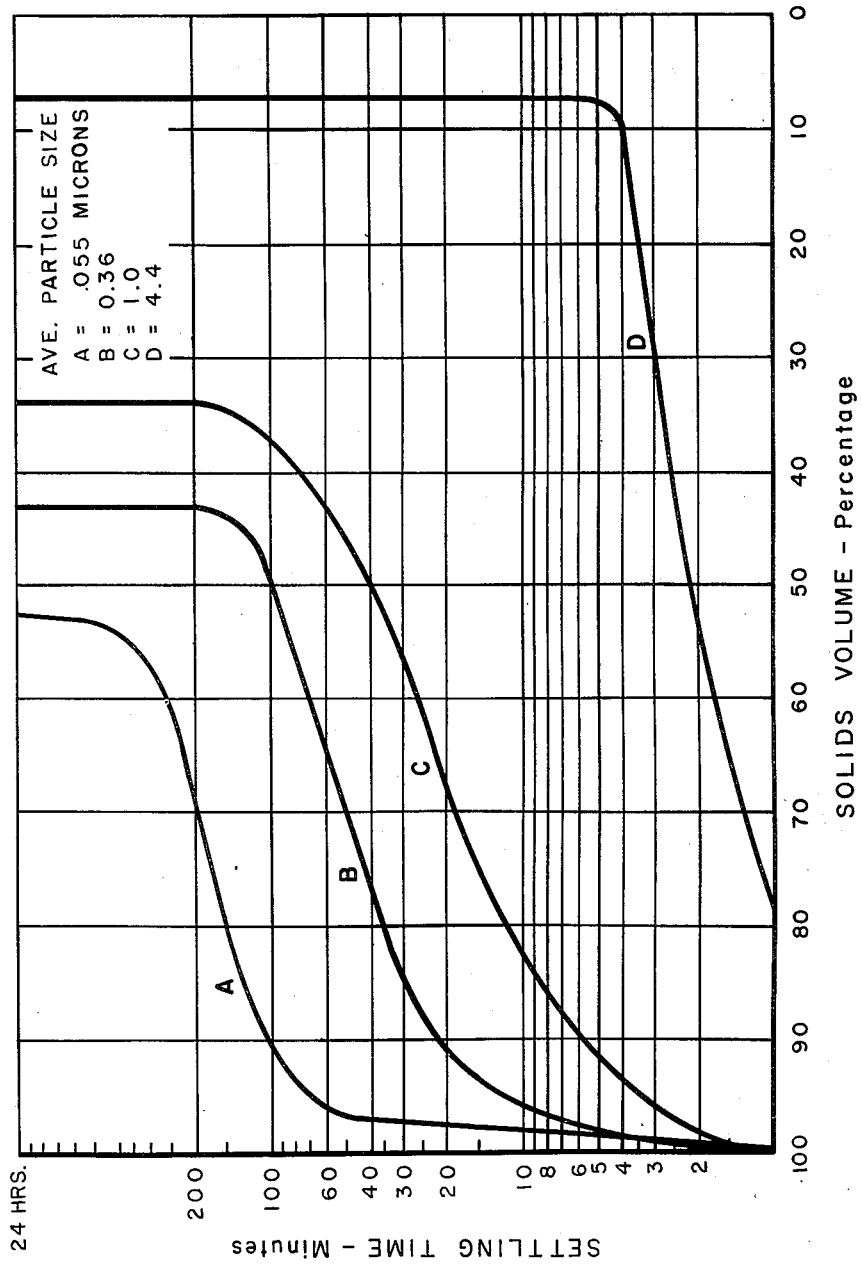
INVENTOR
ROGER L. ANNIS
BY Fred S. Valles
ATTORNEY

2,941,860

METHOD OF PRODUCING FINELY DIVIDED CaCO₃

Roger L. Annis, Painesville, Ohio, assignor to Diamond Alkali Company, Cleveland, Ohio, a corporation of Delaware Filed July 10, 1956, Ser. No. 596,925

1 Claim. (Cl. 23—66)

This invention relates to a process for the production of alkaline earth metal carbonates of fine particle size. More particularly, it relates to a process for the production of finely divided alkaline earth metal carbonates of a particle size that is useful in the paper coating and plastics industries.

Heretofore, several methods for making finely divided alkaline earth metal carbonates have been described. The following are representative; (1) mixing together solutions of a soluble alkaline earth metal salt and a soluble carbonate, (2) mixing together a gas such as carbon dioxide and an alkaline earth metal hydroxide, (3) mixing together an alkaline earth metal oxide or hydroxide and a soluble carbonate. By these methods, several grades of precipitated alkaline earth metal carbonates have been produced ranging in particle size from about .03 to 10 microns or more. Alkaline earth metal carbonates of various particle sizes are useful in the rubber, paper, paint and plastic industries as fillers or as coatings.

Although the process of this invention, to be described below, is applicable to the production of alkaline earth metal carbonates of various particle sizes generally, reference will be made hereinafter to the production of finely divided precipitated calcium carbonate products of 1 micron or less. The invention will also be described with reference to the reaction of ammonium carbonate and calcium chloride since these materials are available in large quantities in connection with a soda ammonia process plant.

One of the main objects of this invention is the production of calcium carbonate of a particle size useful in paper coating, that is of particle size ranging from about 0.1 to 0.7 micron.

It has now been found, in accordance with the process of this invention, that finely divided alkaline earth metal carbonates can be produced by a series of steps comprising contacting aqueous solutions of a soluble alkaline earth metal salt and an alkali carbonate, said alkali carbonate added in stoichiometric excess, adding a minor amount of an alkaline earth metal carbonate of a finer particle size than the final product, vigorously agitating the reaction mixture, while maintaining it at a temperature of from 20 to 50°, and thereafter separating the precipitated product. By the process of this invention, it is found that finely divided alkaline earth metal carbonates of particle size ranging from about 0.1 to 0.7 can be advantageously produced.

The accompanying drawing illustrates an empirical settling or sedimentation test denoted "Beach settling curves" for the determination of the particle size of the precipitated calcium carbonate products, and will be described more fully hereinafter.

In a preferred embodimment of this invention a high quality calcium carbonate is produced in a particle size range of about 0.1 to 0.7 micron by reacting ammonium carbonate and calcium chloride by a series of steps comprising the addition of excess ammonium carbonate to the reaction liquor, a controlled ratio of ammonia to carbon dioxide in the reaction liquor, addition of fine particle size calcium carbonate as a "seed," thoroughly agitating the mixture at optimum conditions of temperature and thereafter separating and drying the product. The process of this invention is applicable to batch or continuous methods as will be described below.

In the practice of this invention, for producing calcium carbonate of particle size of about 0.1 to 0.7 micron, aqueous solutions of ammonium carbonate and calcium chloride are contacted at temperatures ranging from 20 to 40° C., preferably at temperatures of from 35–45° C., and an excess of ammonium carbonate is employed to control the product particle size. The ammonium carbonate added is controlled with respect to the ratio of ammonia to carbon dioxide; a ratio greater than 2.0 (excess ammonia) being preferred. During the course of the reaction or preferably prior to it, there is added calcium carbonate of a particle size of from 0.03 to 0.15 micron in amount of about 0.5% or greater based on the final carbonate product and the reaction mixture is stirred vigorously. In a batch operation, the reactants are contacted in any suitable vessel containing agitating means, for example, a stirrer or impeller while in a continuous process the reaction product can be continuously contacted in a reactor, for example, a centrifugal pump, wherein thorough and complete homogeneous agitation is maintained and thereafter the products are continuously withdrawn from said reactor.

The concentration of the calcium chloride and ammonium carbonate in the aqueous solutions is not deemed critical and as a consequence, calcium chloride in concentrations of from about 90 to 120 gm./liter and ammonium carbonate in concentrations of from 25 gm./liter to 350 gm./liter or more can be employed. It is preferred to use ammonium carbonate concentrations of between 100 and 350 gm./liter concentration, however.

As indicated above, in the practice of this invention a reaction temperature between 20 and 30° C. is found to be very beneficial, although higher or lower temperatures can be used. Temperatures above 40° C., however, result in a product of greater particle size range than desired. Although temperatures above 40° C. are beneficial in a continuous process, where they aid in breaking up the gel formed on contact of ammonium carbonate and calcium chloride, such gels are preferably broken by providing sufficient and rapid agitation and proper pH of the reactant mixture although when heated solutions are available, the use of a high temperature, of course, is not disadvantageous and does permit use of such liquors without requiring cooling.

The amount of ammonium carbonate that can be added as excess in order to control the particle size of the final calcium carbonate product can vary from about 2.5 gms./liter to about 35 gms./liter. Amounts lower than 2.5 grams can be used but there is an attendant increase in particle size of the final product. Amounts above 35 gms./liter can also be used, such use, however, being dictated by economical considerations. In general, excess ammonium carbonate in amounts of from 10 to 35 gms./liter produces advantageous results by way of controlling the desired particle size of the final calcium carbonate product.

Although the effect of excess ammonium carbonate concentration upon the ultimate particle size has been generally described above, it is desirable that an ammonia to carbon dioxide ratio of 2.00 or more be maintained in the reaction mixture in order to correlate the ultimate particle size with the excess ammonium carbonate addition. Thus, when the molar ratio of $NH_3/CO_2$ is less than 2.00 (excess $CO_2$) in the reaction mixture, there appears to be no correlation between the excess ammonium carbonate added and the ultimate particle size of the reaction product. On the other hand, where the molar ratio of $NH_3/CO_2$ is greater than 2.00, i.e., from 2.00 to 2.20, there is a linear relationship obtained between the grams per liter of excess ammonium carbonate added and the final particle size of the product. The molar ratio of $NH_3/CO_2$ in the ammonium carbonate is determined by analyzing for free $NH_3$ or for $CO_2$. Free $NH_3$ is determined by titration with standard hydrochloric acid to methyl orange end-point while $CO_2$ is determined gravimetrically by adsorption as is well known in the art. Ammonium hydroxide can be added to the ammonium carbonate solution to provide the desired ammonia to carbon dioxide ratio.

Advantageous results are also obtained in the process of this invention by the addition of controlled amounts of precipitated calcium carbonate of a finer particle size than the ultimate product to the reaction mixture. The exact effect or influence that the combination of excess ammonium carbonate and minor amounts of calcium carbonate additive have on the ultimate particle size is not understood; however, it is found that both produce beneficial results. For example, the addition of the calcium carbonate seed of a finer particle size than the ultimate product to the ammonium carbonate solution prior to contact with the calcium chloride, results in the production of a controlled particle size calcium carbonate within the range of 0.1 to 0.7 micron size. It is immaterial, however, whether the calcium carbonate seed is added to the ammonium carbonate solution or the calcium chloride solution or to the reaction mixture at the start. As mentioned, however, the calcium carbonate additive should be of a particle size smaller than the end product and for the preferred embodiment of this invention a calcium carbonate of particle size of from 0.03 to 0.15 micron range is added in order to obtain the desired product. If a larger particle size product is desired, it is in order to use a larger "seed" additive but still of smaller particle size than the ultimate product. The amount of calcium carbonate additive that is employed in the process of this invention can range from about 0.5% based on the ultimate calcium carbonate product to 1.5% or higher. Beneficial results are obtained by adding about 0.7% based on the weight of the precipitated calcium carbonate.

It is also within the scope of this invention to substitute the addition of calcium carbonate as a seed by adding an alkali metal hydroxide, for example, sodium hydroxide to the reaction mixture in order to obtain a controlled particle size. The use of sodium hydroxide as a replacement for calcium carbonate seed is, however, not as desirable because large amounts are required to produce the same effectiveness that the smaller quantities of calcium carbonate produce. Thus, with a 50% caustic solution from about 10 to 47% or more based on the calcium chloride feed is required to yield significant results. When amounts such as 47% caustic or greater are used, there is a tendency for the reaction mixture to form a heavy gel if violent mixing is not used. In a continuous process, such a gel would have to be broken in order to keep the lines to the reaction vessels free of such material.

An empirical test denoted as a "Beach settling test" for testing the particle size of the precipitated calcium carbonate is used in the process of this invention. The test is based on the settling rate of particles in an aqueous (10% solids in water) solution. The procedure for this test is as follows: 30 gm. of calcium carbonate are added over a period of 1 minutes to 270 mls. of cold distilled water which is agitated at low speed and the calcium carbonate particles are then agitated at a high speed for about 3 minutes. Exactly 100 mls. of this dispersion is poured into a graduated cylinder and is shaken continuously for 30 seconds. The volume of the solid is recorded at the following intervals: 1, 2, 3, 4, 5, 10, 15, 20, 25, 30, 60 minutes and then at 24 hours. The volume settled within 24 hours is considered the ultimate settled volume of the test particles. Typical settling curves are shown in the attached drawing for particle sizes ranging from about 0.05 micron to about 4.4 micron range. From the curve, it is noted that the larger particle size precipitates occupy the smaller volume, while small particles result in a larger ultimate settled volume. Thus, curve B which is obtained from calcium carbonate of particle size of about 0.36 micron average has an ultimate settled volume of about 43%. The produce of this invention, therefore, i.e., of a particle size of from 0.1 to 0.7 micron, will fall within the range of a settled volume of from about 40% solids and above. In addition to this test, another empirical test which can be used is the moisture test. In this latter test, the moisture content of the calcium carbonate filter cake is determined by first filtering the cake preferably by vacuum and then drying the cake overnight at 100–120° C. The percentage moisture in the cake is the weight of the water driven off during heating times 100 divided by the weight of the sample prior to heating. In general, a moisture content of about 50–55% is indicative of the production of a particle size within 0.1 to 0.7 micron. Obviously, the particle size may be determined by other means, for example, the electron microscope. It should, therefore, be understood that the foregoing methods of determining particle size are not intended as limitations of this invention.

In order that this invention may be more fully understood, and in order to demonstrate the advantages resulting therefrom, reference is made to the following examples.

The examples to be described below are all batch examples, but it should be understood that a continuous process is also intended. In the examples, the reactants are mixed in a vessel of approximately 3 gallon capacity and are agitated by an impeller or propeller that is powered by a compressed air or an electric driven motor. Agitation is rapid and thorough. In the experiments a measured volume of one reagent in the reactor is contacted by a measured volume of the other reagent. The reaction mixture is agitated for about 5 minutes. Two types of mixing of the reactants can be employed: In one, the reactants are mixed rapidly, that is, one reactant is quickly poured into the reactor containing the other in about 2 or 3 seconds. In the other, one reactant is added slowly through a pipe, for example, into the bottom of the vessel at a total time of from 20 to 30 seconds. Unless otherwise indicated, the "rapid" addition method is employed in the examples. In these tests, approximately 3 liters of calcium chloride are introduced into the reactor to contact an appropriate amount of ammonium carbonate solution therein. The product, after the completion of the reaction, is filtered three times in hot water and once in cold, and the crystals are dried overnight at from 110 to 120° C. and then pulverized in order to determine the rate of settling in the empirical settling test.

EXAMPLE I

To determine the effect of concentration and dilution of calcium chloride and ammonium carbonate solutions upon particle size, a series of tests is conducted wherein ammonium carbonate of approximately 334 gm./liter concentration and calcium chloride of a concentration of from 102 to 107 gm./liter are diluted to 150, 200, and 300% of their original volume and reacted at temperatures of from 22 to 29° C. in the presence of a molar excess of ammonium carbonate. Three liters of calcium chloride are reacted in each case with an excess of ammonium carbonate ranging from approximately 2 to 7%. The following results are obtained:

*Table I*

| Number | 1 | 2 | 3 | 4 |
|---|---|---|---|---|
| Percent dilution | None | 150 | 200 | 300 |
| Beach Settling Test: Percent Solids (ultimate) | 10.5 | 10.3 | 12.0 | 14.8 |

Table I demonstrates that the product particle size is within the 4 to 5 micron range and that reagent dilution is not significant in reducing the particle size of the product to within that desired for paper coating.

EXAMPLE II

The effect of reaction temperature is determined by reacting 3 liters of calcium chloride solution with an ammonium carbonate solution at temperatures of 22 and 49° C. with rapid agitation. Table II below shows the results obtained.

*Table II*

| Number | 1 | 2 |
|---|---|---|
| Reaction Temp., °C | 22 | 49 |
| Grams/liter excess $(NH_4)_2CO_3$ | 3.1 | 2.7 |
| $CaCO_3$ additive, percent [1] | .7 | .7 |
| Beach Settling Test: Percent Solids (ultimate) | 59 | 31.5 |

[1] Particle size of 0.03-0.15 micron based on final $CaCO_3$ product.

From the result obtained above, that is, an ultimate settled volume of 31.5% for the test using a temperature of 49°, it is concluded that the use of temperatures above about 40° C. result in the production of particle sizes of over 4 microns as indicated by the empirical settling test. For the process of this invention, therefore, a preferred reaction temperature is from about 20 to 30° C.

EXAMPLE III

The effect of excess ammonium carbonate on the ultimate particle size is determined by adding increasing amounts of ammonium carbonate in solution to calcium chloride as shown in Table III below.

*Table III*

| Number | 1 | 2 | 3 | 4 |
|---|---|---|---|---|
| Reaction Temp., °C | 24 | 24 | 23 | 22 |
| Grams/liter Excess $(NH_4)_2CO_3$ | 3.4 | 13.3 | 31.9 | 31.9 |
| $CaCO_3$ additive, percent [1] | .7 | .7 | .7 | .7 |
| Beach Settling Test: Percent Solids (ultimate) | 64 | 71.5 | 82 | 88 |

[1] Particle size of 0.03-0.15 micron based on final $CaCO_3$ product.

From Table III it is noted that by increasing the amount of excess ammonium carbonate the ultimate settled volume as determined by the empirical test, increases from 64 to 88%, indicating a finer calcium carbonate particle size.

EXAMPLE IV

The effect of the molar ratio of ammonia to carbon dioxide in the ammonium carbonate solution is shown in Table IV below.

*Table IV*

| Number | 1 | 2 | 3 | 4 | 5 | 6 | 7 | 8 |
|---|---|---|---|---|---|---|---|---|
| Reaction Temp., °C | 20 | 20 | 24 | 24 | 24 | 24 | 24 | 24 |
| Grams/liter Excess $(NH_4)_2CO_3$ | 2.7 | 10.2 | 3.4 | 3.6 | 12.9 | 13.3 | 9.1 | 0.2 |
| $CaCO_3$ additive, percent [1] | .7 | .7 | .7 | .7 | .7 | .7 | .7 | .7 |
| Ml. $CaCl_2$ | 828 | 935 | 762 | 761 | 915 | 917 | 919 | 762 |
| Molar Ratio $NH_3/CO_2$ | 1.89 | 1.84 | 2.04 | 2.04 | 2.04 | 2.04 | 2.19 | 2.19 |
| Beach Settling Test: Percent solids (ultimate) | 25.0 | 32 | 64 | 62 | 71.5 | 71.5 | 63 | 51.0 |

[1] Particle size of 0.03-0.15 micron based on final $CaCO_3$ product.

The above test demonstrates that when the molar ratio of ammonia to carbon dioxide is below 2 or greater than 2.19, there is generally an increase in particle size of the calcium carbonate as indicated by the ultimate settled volume of the empirical settling test. When the ratio of ammonia to carbon dioxide is between 2.0 and 2.19, there is produced a desired particle size of a micron range of from 0.1 to 0.7.

EXAMPLE V

The effect of "seeding" the reactant liquors with a small amount of calcium carbonate, based on the weight of the final calcium carbonate product, has a great effect in producing an ultimate particle of the desired size. This is shown in Table V below.

*Table V*

| Number | 1 | 2 | 3 | 4 | 5 | 6 | 7 | 8 |
|---|---|---|---|---|---|---|---|---|
| Reaction Temp., °C | 28 | 22 | 23 | 28 | 23 | 24 | 28 | 23 |
| Grams/liter Excess $(NH_4)_2CO_3$ | 6.8 | 2.8 | 2.2 | 23.6 | 2.9 | 16.7 | 20.1 | 2.6 |
| Ml. $CaCl_2$ | 3,000 | 3,000 | 3,000 | 3,000 | 3,000 | 3,000 | 3,000 | 3,000 |
| Ml. $(NH_4)_2CO_3$ | 993 | 993 | 993 | 1,000 | 993 | 993 | 1,715 | 993 |
| $CaCO_3$ seed (percent based on ultimate product) | | | | | 0.7 | 0.7 | 2.0 | [1] 0.7 |
| Molar Ratio $NH_3/CO_2$ | 12.0 | 2.0 | 1.85 | 2.14 | 2.0 | 1.85 | 2.04 | 2.0 |
| Beach Settling Test: Percent solids (ultimate) | 10.5 | 11.0 | 13.0 | 10.0 | 56.0 | 70.0 | 92 | 21.0 |

[1] The $CaCO_3$ additive is of a particle size of from 0.30-0.15 except item 8 which is of a particle size of about 4.4 microns.

From the above table it should be noted that the final calcium carbonate particle size is strikingly affected by the addition of seed calcium carbonate. Item 4, for example, shows that even when an excess of ammonium carbonate and a molar ratio of ammonia to carbon dioxide greater than 2 is used, there is still produced a larger particle size calcium carbonate if the seed is omitted. The addition of a calcium carbonate seed of about 4.4 microns, as shown in item 8, also shows that the ultimate particle size is of a coarse nature. It is required, therefore, to add a calcium carbonate seed of finer particle size than the ultimate product.

Although the above examples have been described as being carried out in a batch system, the process of this invention for the production of calcium carbonate of the desired particle size is also applicable to continuous methods.

In this connection, the reactants are added continuously to a system such as a centrifugal pump or to a reactor such as is described in copending application Ser. No. 592,097, filed June 18, 1956, assigned to the same assignee of the present invention. The reagents are contacted quickly and the resultant solution is violently mixed and flowed through an elongated zone, such as a pipe until the reaction is complete.

In continuous reaction systems for the production of calcium carbonate by reacting ammonium carbonate and calcium chloride solutions, the calcium carbonate seed can be introduced into either one of the reactant streams. It is preferably introduced into the ammonium carbonate stream in the desired proportion.

Although this invention has been described with reference to the production of a particular particle size calcium carbonate, it should be understood that the examples shown are not intended as limitations, but that this invention is applicable to the production of a range of particle sizes within about from .03 to 10 microns or more by employing the process described herein. Accordingly, resort may be had to such modifications as fall within the spirit of the invention and scope of the appended claim.

What is claimed is:

The method of producing a calcium carbonate product having a settled volume in the Beach settling test of at least about 40% solids and a particle size of about 0.1 to 0.7 microns, which comprises contacting calcium chloride with a stoichiometric excess of from about 2.5 to 35 grams per liter of ammonium carbonate containing a molar ratio of ammonia to carbon dioxide of from about 2.0 to 2.2:1, adding to the reaction mixture from about 0.5% to 1.5% by weight of calcium carbonate of a particle size from about 0.03 to 0.15 microns, based on the final weight of calcium carbonate product, heating the reaction mixture to a temperature of about 20° C. to 50° C. with vigorous agitation and separating the precipitated product.

References Cited in the file of this patent

UNITED STATES PATENTS

| | | |
|---|---|---|
| 1,378,595 | McMahon | May 17, 1921 |
| 2,062,255 | Brooks et al. | Nov. 24, 1936 |
| 2,137,675 | MacIntire | Nov. 22, 1938 |
| 2,141,458 | Bates | Dec. 27, 1938 |
| 2,164,943 | Roderick | July 4, 1949 |
| 2,538,802 | Schur | Jan. 23, 1951 |